(12) United States Patent
Sata

(10) Patent No.: US 7,048,820 B2
(45) Date of Patent: May 23, 2006

(54) METHOD AND APPARATUS FOR PRODUCING TIRE BEAD CORES

(75) Inventor: Yoshiyuki Sata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 298 days.

(21) Appl. No.: 10/300,840

(22) Filed: Nov. 21, 2002

(65) Prior Publication Data

US 2003/0116254 A1    Jun. 26, 2003

(30) Foreign Application Priority Data

Nov. 22, 2001    (JP) .............................. 2001-356912

(51) Int. Cl.
*B29D 30/48* (2006.01)
(52) U.S. Cl. ..................... 156/136; 156/422
(58) Field of Classification Search ............... 156/136, 156/422, 117, 397, 405.1; 245/1.5; 226/93
See application file for complete search history.

(56) References Cited

U.S. PATENT DOCUMENTS

| | | | |
|---|---|---|---|
| 2,979,109 A | | 4/1961 | Dieckmann |
| 3,475,255 A | * | 10/1969 | Lang ........................... 156/422 |
| 4,405,395 A | * | 9/1983 | Wright ........................ 156/117 |
| 5,281,289 A | * | 1/1994 | Debroche et al. ............ 156/117 |
| 5,882,458 A | * | 3/1999 | Kolb et al. ................... 156/136 |

FOREIGN PATENT DOCUMENTS

WO    WO 01/64428 A2    9/2001

OTHER PUBLICATIONS

English abstract for JP 10166473, Jun. 23, 1998.
English abstract for JP 09267410, Oct. 14, 1997.
English abstract for JP 06330485, Nov. 29, 1994.
English abstract for JP 11207832, Aug. 3, 1999.
English abstract for JP 11105156, Apr. 20, 1999.

* cited by examiner

*Primary Examiner*—Geoffrey L. Knable
(74) *Attorney, Agent, or Firm*—Oliff & Berridge, PLC

(57) ABSTRACT

A method and an apparatus for producing tire bead cores, in which a bead wire extending tangentially relative to a bead core winding drum is guided by a guide means that extends radially relative to the winding drum, and the guide means is moved toward clamp jaws of a chuck to cause a translation movement of the bead wire to a position between the clamp jaws, for clamping a leading end of the bead wire by the chuck. The winding drum is rotated together with the chuck so that the bead wire with its leading end clamped by the chuck is helically wound in a circumferential groove of the winding drum as a plurality of layers, thereby forming a bead core having a predetermined cross-section. The segments are then synchronously moved radially inwards, so as to reduce an outer diameter of the winding drum to a value smaller than the inner diameter of the bead core.

10 Claims, 2 Drawing Sheets

METHOD AND APPARATUS FOR PRODUCING TIRE BEAD CORES

BACKGROUND OF THE INVENTION

1. Field of the Invention

The present invention relates to a method and an apparatus for producing tire bead cores.

2. Description of the Related Art

Conventionally, tire bead cores are produced by using an apparatus that includes a winding drum comprised of a plurality of arcuate segments aligned in a circumferential direction of the drum, wherein each segment is radially movable and has an outer periphery formed with at least one circumferential groove, as well as a chuck arranged between the neighboring segments and having a pair of clamp jaws for clamping a leading end of a bead wire that extends in a tangential direction relative to said winding drum. A bead wire extending in the tangential direction of the winding drum is guided toward the clamp jaws in a translation manner, so that the leading end of the bead wire is moved to a position between the clamp jaws, where it is clamped by the chuck. The winding drum is rotated together with the chuck so that the bead wire with its leading end clamped by the chuck is helically wound in the circumferential groove as a plurality of layers, thereby forming a bead core having a predetermined cross-section. Finally, the segments are synchronously moved radially inwards, so as to reduce an outer diameter of the drum to a value smaller than an inner diameter of the bead core.

The bead core produced as above may suffer from a problem when it has not undergone a sufficient plastic deformation and there still partially remains an elastic deformation, that the leading end of the bead wire axially dislocated for some reason or other tends to protrude laterally from the bead core, exhibiting a significant radius of curvature. In order to avoid such a problem, it is proposed to subject the leading end of the bead wire to a plastic deformation in advance, to have a radius of curvature corresponding substantially to the inner diameter of the bead core. In this instance, due unavoidable non-uniformity of the of the bead wire material, an excessive deflection tends to occur at the leading end of the,bead wire causing dislocation thereof from the predetermined position. Thus, the translation movement of the bead wire alone may not result in a proper positioning of the leading end at a position between the clamp jaws.

For these grounds, one may consider it appropriate to supply a bead wire having a straight leading end, or without being subjected to the bending deformation, and cause a translation movement of the leading end to a position between the clamp jaws. However, such a process again involves a problem that the leading end of the bead wire tends to significantly protrude laterally from the bead core, whereby operators in tire factory may be subjected to injuries or, when the bead core is embedded in the product tire, the surrounding carcass layer may be damaged.

DISCLOSURE OF THE INVENTION

It is therefore a primary object of the present invention to provide improved method and apparatus for producing bead cores, wherein the leading end of the bead wire can be readily and positively clamped by the chuck, even when the leading end of the bead wire is bent to have a predetermined radius of curvature.

According to a first aspect of the present invention, there is provided a method for producing tire bead cores, comprising: providing a bead core winding drum that includes a plurality of arcuate segments that are aligned in a circumferential direction of the winding drum, said segments each being radially movable and having an outer periphery formed with a circumferential groove; and a chuck arranged between neighboring segments and having a pair of clamp jaws for clamping a leading end of a bead wire that extends in a tangential direction relative to said winding drum; guiding a bead wire, which extends in a tangential direction of the winding drum, by a guide means that extends radially relative to the winding drum, and moving the guide means toward the clamp jaws to cause a translation movement of a bead wire to a position between the clamp jaws and then clamping a leading end of the bead wire by the chuck; rotating the winding drum together with the chuck so that the bead wire with its leading end clamped by the chuck is helically wound in the circumferential groove as a plurality of layers, thereby forming a bead core having a predetermined cross-section; and synchronously moving the segments radially inwards, after formation of the bead core, so as to reduce an outer diameter of the drum to a value smaller than an inner diameter of the bead core.

According to a second aspect of the present invention, there is provided an apparatus for producing tire beads cores, comprising: a bead core winding drum including a plurality of arcuate segments that are aligned in a circumferential direction of the winding drum, said segments each being radially movable and having an outer periphery formed with a circumferential groove; a chuck arranged between neighboring segments and having a pair of clamp jaws for clamping a leading end of a bead wire that extends in a tangential direction relative to said winding drum; a guide means for the leading end of the bead wire, said guide means being arranged on a radially outer side of the clamp jaws and extending substantially radially; a moving means for moving the guide means toward and away from the clamp jaws, said moving means being operative so as to move the guide means toward the clamp jaws and subsequently cause a translation movement of the leading end of the bead wire in contact therewith, to a position between the clamp jaws; a rotating means for rotating the winding drum together with the chuck so that the bead wire with its leading end clamped by the chuck is helically wound in the circumferential groove as a plurality of layers, thereby forming a bead core having a predetermined cross-section; and a radial actuator means for synchronously moving the segments radially inwards, after formation of the bead core, so as to reduce an outer diameter of the drum to a value smaller than an inner diameter of the bead core.

With the above-mentioned method and apparatus according to the present invention, the bead wire extending substantially tangentially relative to the winding drum is moved in a translation manner toward the chuck so that the leading ends of the bead wire approaches the clamp jaws. The leading end of the bead wire has already been subjected to plastic deformation, so that the leading end of the bead wires is bent to have a radius of curvature that corresponds substantially to the inner diameter of the bead core. As mentioned above, in the case of a bead wire having a bent leading end, an excessive deflection may occur at the leading end of the bead wire depending upon non-uniformity of its material, thereby giving rise to a tendency wherein the leading end of the bead wire is dislocated from the predetermined position before it is moved in translation manner. According to the present invention, however, the leading end of the bead wire is effectively guided by the guide means upon translation movement of the bead wire toward the chuck. Thus, irrespective of whether or not the leading end of the bead wire has an excessive deflection, it is readily possible positively to guide the leading end to a position between the jaw members of the chuck.

It is preferred that the chuck is radially moved together with the segments as the latter are synchronously moved radially. By ensuring that the chuck is moved radially inwards simultaneously with the movement of the segments radially inwards, it is possible to avoid undesired engagement of the bead core with the chuck when the bead core is to be removed from the winding drum, thereby effectively preventing the leading end of the bead wire from being subjected to an axial dislocation, and facilitating the handling of the bead wire and/or bead core.

In this instance, the apparatus according to the present invention may further comprise a connector member for connecting the chuck and the radial actuator means with each other so that the chuck is moved radially together with the segments in operation of the radial actuator means.

Alternatively, the chuck may be secured to the segment so as to be radially movable together with the segments in operation of the radial actuator means.

It is preferred that the guide means comprises an attraction means for attracting the bead wire such that the bead wire is brought into contact with the guide means. The attraction means may comprise a magnet, e.g., a permanent magnet or electromagnet.

BRIEF DESCRIPTION OF THE DRAWINGS

The present invention will be more fully described below with reference to a preferred embodiment shown in the accompanying drawings.

DETAILED DESCRIPTION OF THE PREFERRED EMBODIMENTS

Figure 1:
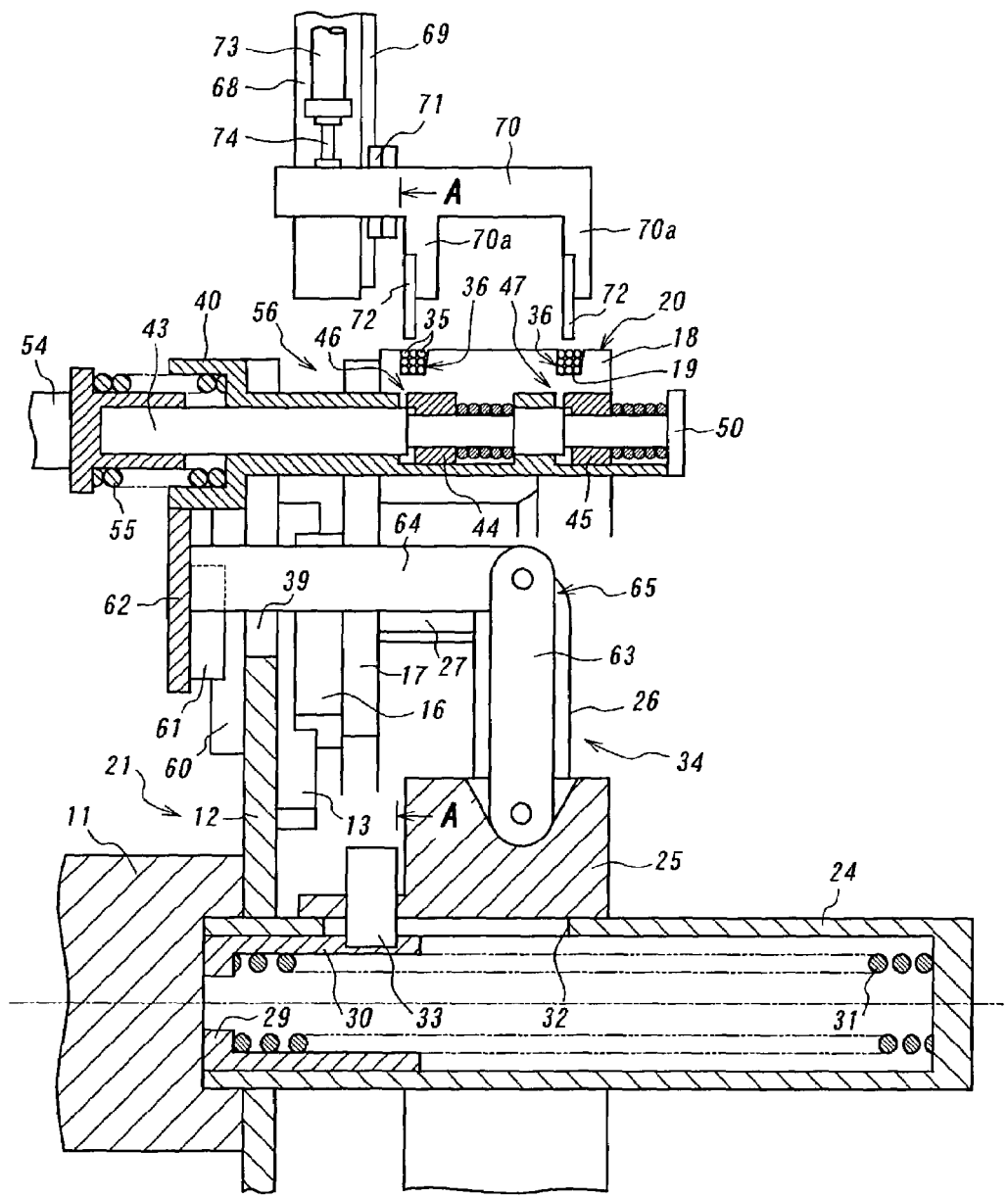
FIG. 1 is a partly sectional side view of the apparatus according to a preferred embodiment of the present invention.
Figure 2:
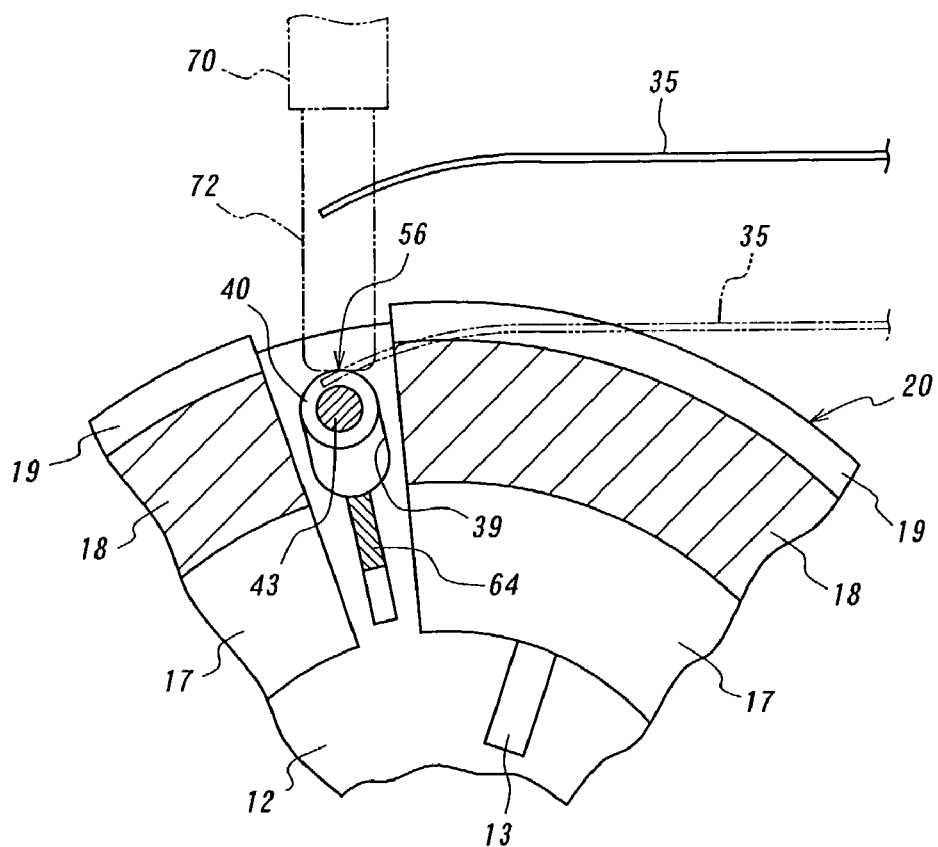
FIG. 2 is an enlarged view as seen in the direction of arrow A in FIG. 1.
Figure 3:
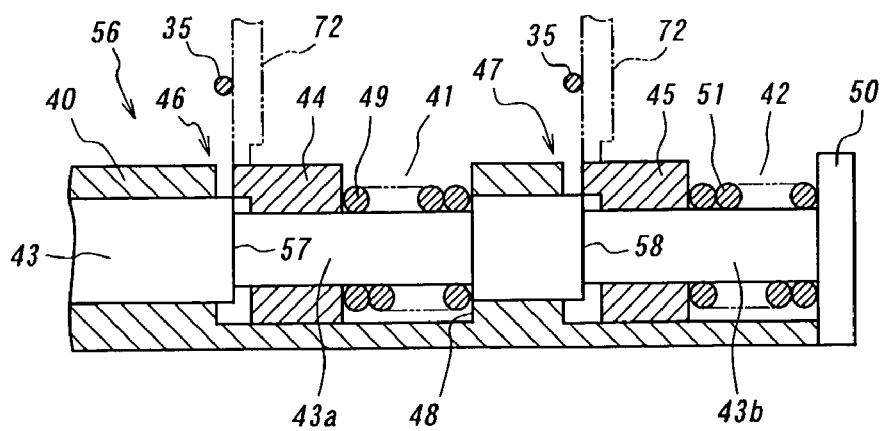
FIG. 3 is an enlarged sectional view of the apparatus of FIG. 1, showing the region including a chuck.

A preferred embodiment of the apparatus for producing tire bead cores according to the present invention is shown in FIGS. 1 to 3, wherein reference numeral 11 denotes a horizontal main shaft that is rotatably supported by a drive means, not shown. Thus, for example, one end of the main shaft 11 is connected to a motor (not shown) through an endless belt and pulleys, so that the main shaft 11 is driven into rotation as the motor is operated. Another end of the main shaft 11 is fixedly secured to a coaxial disc 12. The disc 12 has a side surface remote from the main shaft 11, which is provided with a plurality of pairs of guide rails 13 each extending in the radial direction. The pairs of guide rails 13 are equidistantly spaced from each other in the circumferential direction.

Each pair of the guide rails 13 serves to slidably support an arcuate slider 17 via a slide bearing 16. The slider 17 has a surface in its radially outer end region, which is remote from the guide rails 13 and to which an arcuate segment 18 is fixedly secured. Thus, the segments 18 are arranged to as to be radially movable and aligned in the circumferential direction one after the other, exhibiting as a whole a ring shape that is divided into a plurality of portions.

The outer periphery of each segment 18 is formed with at least one circumferential groove 19 having a predetermined cross-section, i.e., two circumferential grooves having a square cross-section, which are spaced from each other in the axial direction. The segments 18 as a whole constitute a winding drum 20. Furthermore, the shaft 1, the disc 12, as well as the motor, the endless belt and the pulleys (which are not shown), as a whole constitute the rotating means 21 for rotating the winding drum 20 together with the chuck to be described hereinafter.

Reference numeral 24 denotes a spring box that is fixedly secured to the other end of the main shaft 11 coaxially thereto, having a cylindrical shape with a closed end. The spring box 24 has an outer surface axially slidably fitted into a substantially annular movable member 25. Reference numeral 26 denotes a plurality of connector links (same in number as the sliders 17), which extend in substantially radial direction and which are arranged in the circumferential direction with an equal angular distance. Each connector link 26 has a radially inner end portion that is pivotally connected to the movable member 25 so that the connector link 26 can be swung about the pivot connection.

Reference numeral 27 denotes brackets each extending axially with one end fixedly secured to the other side surface of the slider 17. Each bracket 27 has another end connected to the radially outer end portion of the connector link 26. As a result, when the movable member 25 is moved toward the other side, i.e., toward right in FIG. 1, the connector link 26 assumes a larger inclination angle relative to the radial direction so that the brackets 27, the sliders 17 and the segments 18 as being guided by the guide rails 13 are synchronously moved radially inwards, thereby decreasing the diameter of the winding drum 20. Conversely, when the movable member 25 is moved toward the one side, i.e., toward left in FIG. 1, the connector link 26 is situated at a substantially upright position, assuming a smaller inclination angle relative to the radial direction, so that the brackets 27, the sliders 17 and the segments 18 as being guided by the guide rails 13 are synchronously moved radially outwards, thereby increasing the diameter of the winding drum 20.

At one end region within the spring box 24, there is arranged an axially movable retainer 30 having an inner collar 29 at one end. A compression coil spring 31 is arranged between the collar 29 of the retainer 30 and the bottom wall of the spring box 24 so as to resiliently urge the retainer 30 toward the one side, i.e., toward the main shaft 11. An axial slit 32 is formed in the spring box 24 for receiving a pin 33 extending therethrough for connecting the retainer 30 with the movable member 25. As a result, the movable member 25 as being urged by the spring 31 normally assumes at a stroke end position close to the main shaft 11, in which the connector link 26 is situated at a substantially upright position. The movable member 25 can be moved toward the other side, i.e., away from the main shaft 11, when a thrust is exerted by a cylinder device (not shown), which is connected to the disc 12.

The above-mentioned guide rails 13, slide bearing 16, slider 17, spring box 24, movable member 25, connector link 26, bracket 27, retainer 30, spring 31, connector pin 33 and cylinder, as a whole, constitute a radial actuator means 34, such as a cylinder device, for synchronously moving the segments 18 radially inwards or outwards, so as to reduce or increase the outer diameter of the drum 20 to a desired value. When the drum 20 having an increased outer diameter is rotated by the rotating means 21, a bead wire 25 comprised of a steel cord or steel monofilament is spirally wound into plural layers within the circumferential groove 19 in the drum 18, so as to form a bead core 36 having a desired cross-sectional shape, i.e., square shape in the illustrated embodiment.

After the formation of the bead core 36 has been completed, the segments 18 are synchronously moved radially inwards by the actuator means 34, so as to reduce the outer diameter of the drum 20 to a value smaller than the inner diameter of the bead core 36. A transfer means, not shown, is then operated to hold the bead core 36 and transfer it to a subsequent station for further processing.

Reference numeral 40 denotes a support casing in the form of a stepped cylinder, which is arranged between adjacent segments 18 to extend in parallel with the main shaft 11. One end of the support casing 40 extends through a radial slit 39 that is formed in the radially outer end portion of the disc 12, and another end of the support casing 40 is formed with two cutouts 41, 42 that are spaced from each other in the axial direction. Reference numeral 43 denotes a movable shaft that is axially movably arranged within the support casing 40. The movable shaft 43 has an end region provided with two small diameter portions 43a, 43b that are spaced from each other in the axial direction such that the small diameter portion 43a is axially aligned with the cutout 41 and the small diameter portion 43b is axially aligned with the cutout 42.

Reference numerals 44, 45 denote jaw members that are axially movably fitted over the small diameter portions 43a, 43b of the movable shaft 43, respectively. The jaw member 44 and a portion of the support case 40, which is situated opposite to the jaw member 44, jointly constitute a pair of clamp jaws 46 for clamping the leading end of the bear wire 35 to be wound in the circumferential groove 19 on one side. Similarly, the jaw member 45 and that portion of the support case 40, which is situated between the cutouts 41, 42, jointly constitute another pair of clamp jaws 47 for clamping the leading end of the bear wire 35 to be wound in the circumferential groove 19 on the other side. A compression coil spring 49 is arranged between the jaw member 44 and a shoulder portion 48 that is situated at the end portion of the small diameter portion 43a, for axially urging the jaw member 44. Another compression coil spring 51 is arranged between the jaw member 45 and a flange 50 that is fixedly secured to the end portion of the movable shaft 43, for axially urging the jaw member 45.

Reference numeral 54 denotes a transfer rod that is fixedly secured to the end portion of the movable shaft 43. A compression coil spring 55 is arranged between the transfer rod 54 and the support casing 40, for axially urging the movable shaft 43 and the transfer rod 54. The pairs of clamp jaws 46, 47 are each closed by the urging force of the springs 55, 49, 51 so that when the leading end of the bead wire 35 extending tangentially relative to the drum 20 is situated between the pairs of clamp jaws 46, 47, the leading end of the bead wire 35 is clamped by the respective pairs of clamp jaws 47, 47 axially from both sides.

When, conversely, an axial thrust acting against the urging force of the springs 55, 49, 51 is exerted to the transfer rod 54 by an actuator (not shown), which may be comprised of a cylinder device, a cam device or the like, the movable shaft 43 is moved axially. On this occasion, the shoulder portions 57, 58 at the end of the small diameter portions 43a, 43b of the movable shaft 43 are brought into abutment with the jaw members 44, 45, respectively, so that the clamp jaws 46, 47 are each opened to release the leading end of the bead wire 35. The above-mentioned support casing 40, movable shaft 43, clamp jaws 64, 47, spring 49, flange 50, spring 51, transfer rod 54 and spring 55 jointly constitute a chuck 56 arranged between neighboring segments 18 and having pairs of clamp jaws 64, 47 for clamping the leading end of the bead wire 35 that extends tangentially relative to the winding drum 20.

On the radially inner side of the support casing 40, the disc 12 on its surface remote from the radial actuator means 34 is provided with a pair of guide is rails 60 each extending in the radial direction. A slide bearing 61 is slidably engaged with the guide rail 60 and secured to a connector plate 62 that, in turn, is fixedly secured to the support casing 40. As a result, it is possible to cause a radial movement of the chuck 56 and the connector plate 62 while being guided by the guide rails 60.

Reference numeral 63 denotes a connector link that normally extends in parallel with the above-mentioned connector link 26. The connector link 63 has a radially inner end portion that is connected to the movable member 25. Reference numeral 64 denotes a bracket that is in parallel with the bracket 27 of which one end extends through the slit 39. The bracket 64 has one end portion that is fixedly secured to the connector plate 62, and another end portion that is connected to the radially outer end portion of the connector link 63.

The above-mentioned connector plate 62, connector link 63 and bracket 64 jointly constitute a connector 65 for connecting the chuck 56 and the radial actuator means 34. Thus, when the radial actuator means 34 is operated to synchronously move the segments radially, e.g., radially inwards, the chuck 56 as guided by the guide arils 60 is simultaneously moved by the radial actuator means 34 in the same direction (i.e., radially inwards) by the same distance.

In this way, by ensuring that the chuck 56 is moved radially inwards simultaneously with the movement of the segments 18 radially inwards, it is possible to avoid undesired engagement of the bead core 36 with the chuck 56 when the bead core 36 is to be removed from the winding drum 20, thereby effectively preventing the leading end of the bead wire 35 from being subjected to an axial dislocation, and facilitating the handling of the bead wire 35 and/or bead core 36.

As an alternative arrangement for achieving a simultaneous radial movement of the chuck 56 with the segments 18, the chuck 56 may be connected to one of the neighboring segments 18 through an appropriate connector element. Such an arrangement also is simple and less costly in structure.

Reference numeral 68 denotes a vertical post that is arranged immediately above the chuck 56. The post 68 has a side surface provided with a guide rail 69 that extend vertically. Reference numeral 70 denotes a carriage having a slide bearing 71 that is slidably engaged with the guide rail 69 so that the carriage 70 can be moved vertically along the post 68. The carriage 70 has two projections 70a projecting downwards, which are spaced from each other by a distance that is equal to the axial distance between the circumferential grooves 19.

Each projection 70a of the carriage 70 has a bottom end portion connected to the upper end portion of a guide member 72 in the form of a strip that extends radially. The guide members 72 are arranged on the radially outer side of the pairs of clamp jaws 46, 47 or, more specifically, jaw members 44, 45. The guide members 72 are made of permanent magnet at least partly, and preferably entirely as in the illustrated embodiment. Thus, the bead wire 35 made of ferromagnetic material can be effectively attracted by the guide members 72 so that the leading end of the bead wire 35 is effectively maintained in contact with the guide member 72. It is therefore possible positively to guide the leading end of the bead wire to a position between the pair of clamp jaws 46 or the pair of clamp jaws 47.

Reference numeral 73 denotes an actuator in the form of a vertical cylinder device that is secured to the vertical post 68 at a position above the carriage 70. The cylinder device 73 has a piston rod 74 with a tip end that is connected to the carriage 70. Thus, when the cylinder device 73 is operated to extend or retract the piston rod 74, the guide members 72 are moved radially toward and away from the pairs of the clamp jaws 46, 47 of the chuck 56.

The operation of the apparatus according to the illustrated embodiment will be explained below. It is assumed that the movable member 25 as urged by the spring 31 is situated at its one stroke end position so that the connector links 26, 63 extend radially to maintain the winding drum 20 in a radially expanded position with the segments 18 and the chuck 56 in their radially outer limit positions. On this occasion, the transfer rod 54, the movable shaft 43 and the jaw members 44, 45 are being applied with an axial thrust from an actuator (not shown), and thus situated in their axial limit positions in which the pairs of clamp jaws 46, 47 are opened.

When the cylinder device 73 is operated to extend the piston rod 74, the guide members 72 as being guided by the guide rail 69 are moved radially inwards or downwards together with the carriage 70, gradually approaching the pairs of clamp jaws 46, 47 of the chuck 56. Such approaching movement of the guide members 72 is stopped when the lower ends of the guide members 72 are brought into contact with the jaw members 44, 45 of the clamp jaws 46, 47.

Two bead wires 35 extending substantially tangentially relative to the winding drum 20 are moved in a translation manner toward the chuck 56, from the solid line position to the imaginary line position as shown in FIG. 2, so that the leading ends of the bead wires 35 approach the clamp jaws 46, 47. It is assumed that the leading ends of the bead wires 35 have already been subjected to plastic deformation, by a forming device (not shown), so that the leading ends of the bead wires 35 are bent to have a radius of curvature that corresponds substantially to the inner diameter of the bead core 36.

In the case of a bead wire 35 of which the leading end is bent as mentioned above, even when the leading end is axially dislocated after formation of the bead core 36, it is possible effectively to prevent undesired lateral protrusion of the bead wire 35 from the bead core 36. On the other hand, however, an excessive deflection may occur at the leading end of the bead wire 35 depending upon non-uniformity of its material, thereby giving rise to a tendency wherein the leading end of the bead wire 35 is dislocated from the predetermined position before it is moved in translation manner.

Such a problem can be effectively eliminated according to the present invention. Thus, in the illustrated embodiment, even when the leading end of the bead wire 35 is dislocated from the predetermined position, the leading end of the bead wire 35 is attracted by the magnetic force of the guide member 72 upon translation movement of the bead wire 35. Thus, irrespective of whether or not the leading end of the bead wire 35 has an excessive deflection, it is readily possible positively to guide the leading end to a position between the jaw members 44, 45 of the chuck 56.

When the axial thrust by the actuator is removed from the transfer rod 54, the movable shaft 43 and the jaw members 44, 45 are moved under the resilient force of the springs 49, 51, 55 so that the leading ends of the bead wires 35 are clamped by the jaw members 44, 45. The piston rod 74 of the cylinder device 73 is then retracted to move the guide members 72 upwards back to their original positions.

The main shaft 11 is then rotated by the motor (not shown), jointly with the support disc 12, the winding drum 20 and the chuck 56 clamping the leading ends of the bead wires 35. By this, the bead wires 35 are helically wound in the circumferential grooves 19 of the winding drum 20 while axially moving back and forth and thereby forming a plurality of layers, so as to simultaneously produce bead cores 36 having a square cross-section.

Although not shown in the drawings, the bead wire 35 is cut at a predetermined cut position by a cutter, while holding the bead wire 35 at a location adjacent to the cut position by means of a holder. The actuator for the transfer rod 54 is operated to move the transfer rod 54, the movable shaft 43 and the jaw members 44, 45 against the resilient force of the springs 49, 51, 55, so as to open the clamp jaws 46, 47 and thereby release the leading ends of the bead wires 35.

The actuator means 34 associated with the movable member 25 is then operated so as to move the movable member 25 against the resilient force of the spring 31, i.e., toward right in FIG. 2, together with the retainer 30 and the connector pin 33. By this, the connector links 26, 63 undergo swinging movement about their pivoted inner ends, gradually increasing the inclination angle relative to the radial direction. As a result, the segments 18 of the winding drum 20 are synchronously moved radially inwards, together with the sliders 17, while being guided by the guide rails 13. At the same time, the chuck 56 is also moved radially inwards, together with the connector plate 62, while being guided by the guide rail 60. Such inward movement of the segments 18 and the chuck 56 is stopped when the outer diameter of the winding drum 20 reaches a value that is smaller than the inner diameter of the bead core 36.

The bead cores 36 produced as above are held by the transfer means, not shown, and transferred to a subsequent station for further processing. The operation of the actuator means 34 is then stopped so that the axial thrust is removed from the movable member 25. As a result, the movable member 25 is returned to its stroke end position by the spring 31, so that the segments 18 and the chuck 56 are moved back radially outwards to the original positions.

It will be appreciated from the foregoing description that the present invention provides improved method and apparatus for producing bead cores, wherein the leading end of the bead wire can be readily and positively clamped by the chuck, even when the leading end of the bead wire is bent to have a predetermined radius of curvature.

While the present invention has been described above with reference to a specific embodiment shown in the accompanying drawings, it has been presented by way of example only and various changes may be made without departing from the scope of the scope of the invention as defined by the appended claims.

Thus, for example, it is not a prerequisite condition that the radial movement of the chuck and the opening/closing operation of the chuck are performed at different timings as in the illustrated embodiment. The arrangement may be modified so that the chuck is closed during its radial inward movement and opened during its radial outward movement.

What is claimed is:

1. A method for producing tire bead cores, comprising:
   providing a bead core winding drum that includes a plurality of arcuate segments aligned in a circumferential direction of the winding drum, said segments each being radially movable and having an outer periphery formed with at least one circumferential groove; and a chuck arranged between neighboring segments and having a pair of clamp jaws for clamping a leading end of at least one bead wire that extends in a tangential direction relative to said winding drum;

guiding the at least one bead wire, which extends in a tangential direction of the winding drum, by a guide including at least one protrusion that extends radially relative to the winding drum, and moving the guide vertically toward the clamp jaws to cause a translation movement of the at least one bead wire to a position between the clamp jaws and then clamping a leading end of the at least one bead wire by the chuck;

rotating the winding drum together with the chuck so that the at least one bead wire with its leading end clamped by the chuck is helically wound in the at least one circumferential groove as a plurality of layers, thereby forming a bead core having a predetermined cross-section; and synchronously moving the segments radially inwards, after formation of the bead core, so as to reduce an outer diameter of the drum to a value smaller than an inner diameter of the bead core.

2. The method according to claim 1, wherein the chuck is radially moved together with the segments as the latter are synchronously moved radially.

3. The method according to claim 1, wherein the guide comprises an attractor, and further comprising attracting the at least one bead wire by the attractor so as to bring the at least one bead wire into contact with the guide.

4. The method according to claim 3, wherein the attractor comprises a magnet.

5. An apparatus for producing tire beads cores, comprising:
- a bead core winding drum including a plurality of arcuate segments that are aligned in a circumferential direction of the winding drum, the segments each being radially movable and having an outer periphery formed with at least one circumferential groove;
- a chuck arranged between neighboring segments and having a pair of clamp jaws for clamping a leading end of at least one bead wire that extends in a tangential direction relative to the winding drum;
- a guide for the leading end of the at least one bead wire, the guide being at least one protrusion arranged on a radially outer side of the clamp jaws and extending substantially radially;
- a mover for moving the guide vertically toward and away from the clamp jaws, said mover being operative so as to move the guide toward the clamp jaws and cause a translation movement of the leading end of the at least one bead wire in contact therewith, to a position between the clamp jaws;
- a rotator for rotating the winding drum together with the chuck so that the at least one bead wire with its leading end clamped by the chuck is helically wound in the at least one circumferential groove as a plurality of layers, thereby forming a bead core having a predetermined cross-section; and
- a radial actuator for synchronously moving the segments radially inwards, after formation of the bead core, so as to reduce an outer diameter of the drum to a value smaller than an inner diameter of the bead core.

6. The apparatus according to claim 5, wherein said chuck is radially movable together with the segments, as the segments are synchronously moved radially by the radial actuator.

7. The apparatus according to claim 6, further comprising:
- a connector member for connecting the chuck and said radial actuator with each other so that the chuck is moved radially together with the segments in operation of the radial actuator.

8. The apparatus according to claim 6, wherein the chuck is secured to the segment so as to be radially movable together with the segments in operation of the radial actuator.

9. The apparatus according to claim 5, wherein the guide comprises an attractor for attracting the at least one bead wire such that the at least one bead wire is brought into contact with the guide.

10. The apparatus according to claim 9, wherein the attractor comprises a magnet.

* * * * *